W. J. STEINLE.
TREATMENT OF MATERIALS.
APPLICATION FILED APR. 24, 1915.
1,283,947.
Patented Nov. 5, 1918.
2 SHEETS—SHEET 2.
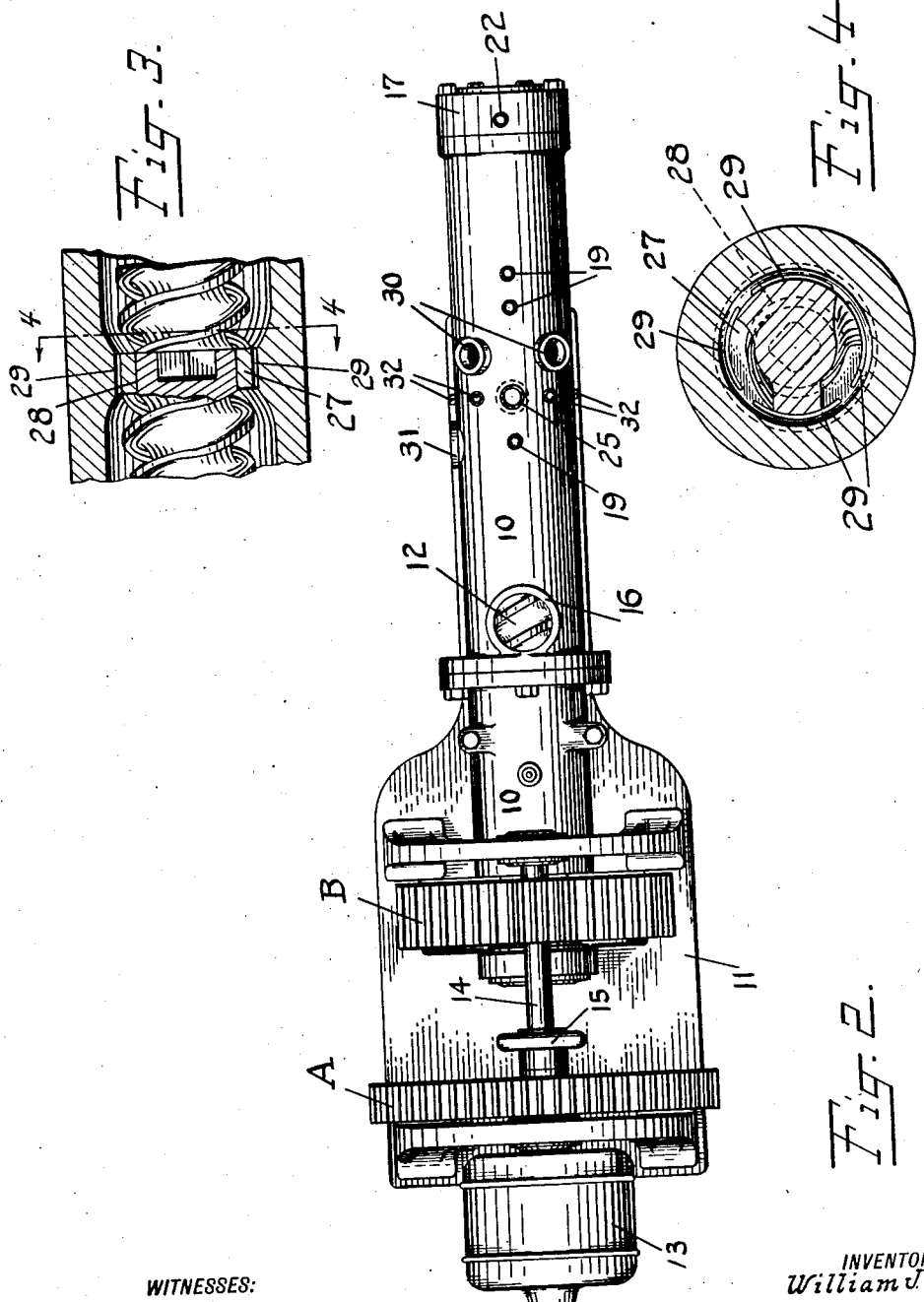
WITNESSES:
INVENTOR
William J. Steinle.
BY
HIS ATTORNEY

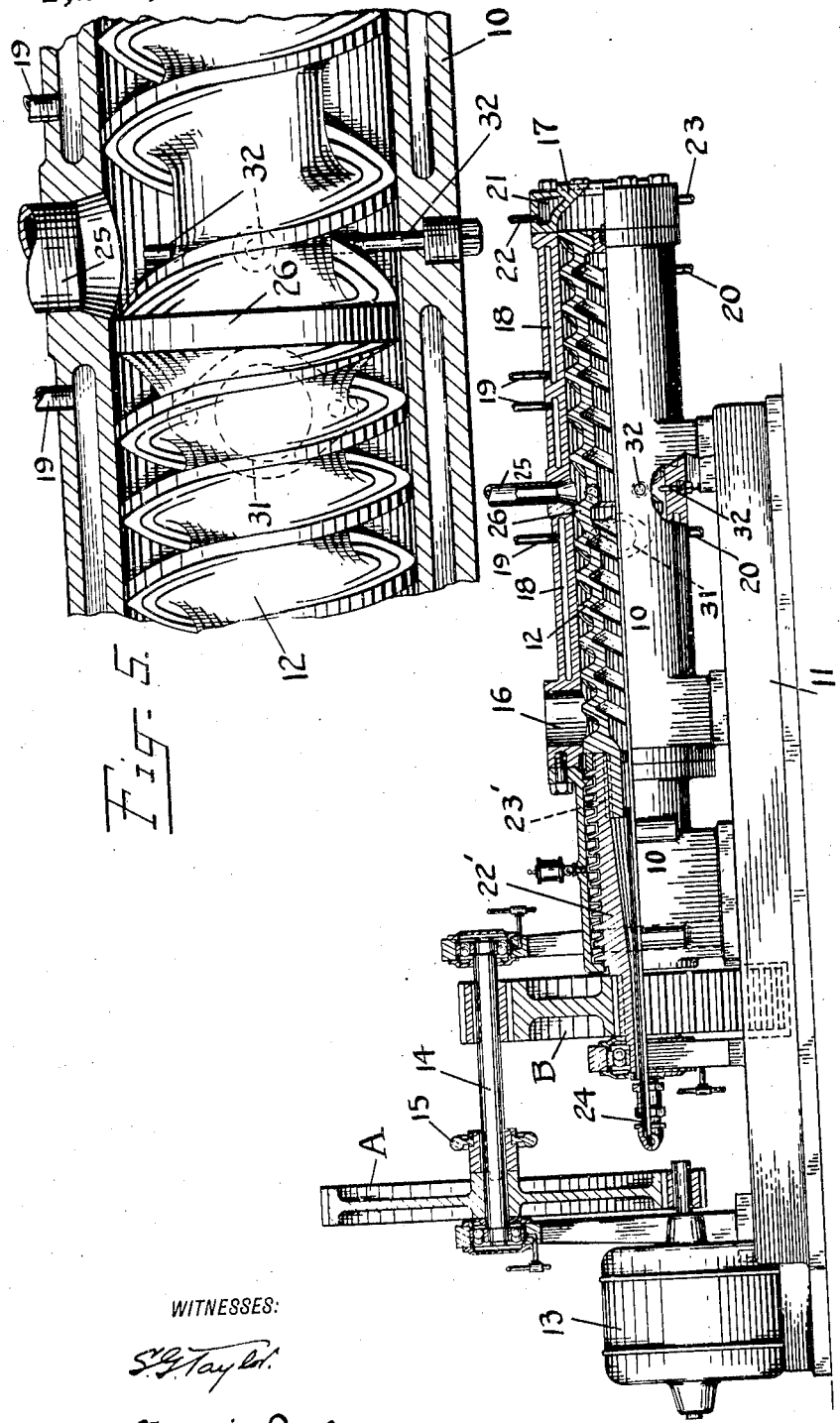

UNITED STATES PATENT OFFICE.

WILLIAM J. STEINLE, OF ELMHURST HEIGHTS, NEW YORK, ASSIGNOR TO RUBBER REGENERATING COMPANY, A CORPORATION OF INDIANA.

TREATMENT OF MATERIALS.

1,283,947.  Specification of Letters Patent.  Patented Nov. 5, 1918.

Application filed April 24, 1915. Serial No. 23,654.

*To all whom it may concern:*

Be it known that I, WILLIAM J. STEINLE, a citizen of the United States, and a resident of Elmhurst Heights, county of Queens, and State of New York, have invented certain new and useful Improvements in the Treatment of Materials, of which the following is a full, clear, and exact description.

My invention relates to the treatment of materials more particularly rubber, rubber-like, or similar materials, and has for an object to subject the same essentially to the action of a vacuum, whereby any entrapped medium, such as fluids, gases, etc., will be effectually removed, leaving a homogeneous mass of material for further treatment.

My invention may be carried out in many different ways, and in its broad aspect requires that the material being treated shall be subjected to the action of a mechanism which, by what may be termed a "filming" operation, will so manipulate the mass of the same as to liberate entrapped fluids, gases, or the like, which the vacuum to which it is being simultaneously subjected will remove, and which when so treated will be thereby rendered substantially impervious to the reëntry therein of gases, fluids, or the like, when the vacuum is broken.

In carrying out my invention I arrange the mechanism so that the material while being acted on therein will be exposed in the form of a thin sheet, film, skin, or the like, to the action of a vacuum it being provided furthermore that the material itself forms seals on both sides of the sheet, film, skin, or the like, thus permitting an open feed of the material and an open discharge.

With the above and other objects in view the invention consists in the novel details of construction and combinations of parts hereinafter fully described, and pointed out in the appended claims, it being understood that various modifications may be made within the scope of the claims without departing from the spirit or sacrificing any of the advantages of the invention.

An apparatus suitable for carrying out the invention is shown in the accompanying drawings, in which:

Figure 1 is an elevation of the apparatus with a portion in section;

Fig. 2 is a plan view of the apparatus;

Fig. 3 is a fragmentary longitudinal sectional view showing a modified form of filming collar;

Fig. 4 is a cross-sectional view on the line 4—4, Fig. 3;

Fig. 5 is an enlarged sectional view of the filming collar.

Referring now to the drawings 10 designates a cylindrical casing which is supported in horizontal position upon a frame 11. Mounted for free rotation in the casing is a feed screw 12, which will be hereinafter more fully described, the feed screw being driven from one end by a motor 13 or other prime mover, which is operatively connected to the feed screw through two reduction gear trains A and B. The common connecting shaft 14 of these trains is in two parts connected by a clutch 15 which may be thrown out should the machine become stalled so that the motor and the first train of gears A may be started and then the clutch thrown in whereby advantage may be taken of the energy of the revolving motor armature, in addition to the running torque to start the machine.

The casing is provided at one end with a feed hopper 16, and secured to the opposite open end of the casing is a die-head 17 wherein may be secured a forming die for shaping the discharged material. The casing is provided with a water jacket 18 which is fed by pipes 19 and drained by pipes 20, whereby the temperature of the casing may be controlled. Furthermore, the die-head 17 is provided with a water jacket 21 which is fed by a pipe 22 and drained by a pipe 23, whereby the temperature of the die-head may be controlled.

Preferably the water jacket of the die-head and the water jacket of the casing have no communication with each other in order that a differential of temperature may be maintained therebetween if desired, and also the water jacket of the casing is preferably made of independent sections or units so that it may be possible to maintain different temperatures in different sections of the casing if desired.

The feed screw 12 is removably secured in the casing upon a thrust bearing 22' by means of a feather 23' and is hollow, the interior of the screw conforming approximately to the outside contour, whereby an enhanced surface is exposed to the heating or cooling agent, which heating or cooling agent is admitted through a pipe connection 24 controllable by the operator. To remove the feed screw it is simply necessary to uncouple the pipe connection 24, remove the die-head 17 from the delivery end of the machine, and then insert a suitable hook or the like in the interior of the feed screw and withdraw the latter by suitable tackle.

The pitch of the screw in the present embodiment is shown to be substantially uniform for about one-half the length of the screw, there being near the center of the screw an obstruction either upon the screw itself or in the wall of the casing, as will be more particularly described, which obstruction causes the material to crowd in the casing and form a seal thereat. Beyond this obstruction the pitch of the screw is diminished to cause the material again to crowd and form another seal in the casing. Between these two seals the material is subjected to the action of a vacuum exerted through a pipe 25 so that an open feed, as well as an open discharge of the material is permitted without breaking of the vacuum.

For causing the material to be exposed to the action of the vacuum in a thin sheet, film, or skin, a collar 26 may be formed on the feed screw to constitute the above described obstruction, the collar causing the material to flow over it as a layer, the thickness of which will be determined by the diameter of the collar, and it is preferable that the layer be relatively thin, that is, be of the approximate thickness of a sheet, film, or even skin, whereby a large superficial area of surface and consequent extremely small cross-section of the material will be exposed to the action of the vacuum, whereby any medium such as fluids, gases, light oils, moisture, air, or the like, entrapped in the material being treated will be liberated, and these will be removed by the vacuum.

It is not essential, however, that the filming collar be carried by or formed upon the screw, as it may be carried by or formed in the casing 10, one embodiment of this construction being shown in Fig. 3, wherein the filming collar 27 is shown as integral with the frame and projecting down into a groove 28 formed in the feed screw, there being channels 29 formed in the collar to allow the material to pass therethrough in the form of a thin sheet, film, or skin. To facilitate assembly of the parts of this modification the feed screw may be made in sections as shown.

For the purpose of observing the way the material is running in the apparatus, and also in assisting in cleaning out the machine back of the filming collar, sight ports 30 and a clean-out port 31 are formed in the casing as shown.

While I have illustrated a smooth bore casing, I do not limit myself to this construction as I may provide projections 32 or baffles, or the like, to agitate the material during its passage along the feed screw. I may even provide baffles in the delivery opening, if desired.

While I have shown a casing of uniform diameter throughout, I do not wish to limit myself to such construction, as the same may be varied in any suitable manner, as for instance, by tapering the same, or forming the same of different diameters at various points therein, or even by forming the casing of a combination of both tapering and uniform bores.

So also I do not wish to limit myself to any particular form of drive for the feed screw since this may be provided at either end or at any intermediate point and in any suitable manner. And the feed screw may be similarly pitched for both halves of its length, or the pitch of both halves may be varied, or I may even form the feed screw of two separate halves which may be driven separately and their speed varied at will. Also a control of the feed or the discharge of the material, or both, may operate to controllably affect the vacuum. And I do not wish to limit myself to any particular number of points at which the vacuum is to be exerted on the material in the apparatus, as such vacuum may be applied at any desired number of points as experience may dictate.

By providing a single discharge from the casing I am enabled to obtain an enlarged continuous discharge of material in compact form which may be used, if desired, in this form, thus preserving all the advantages obtained by its submission in the apparatus to the action of the vacuum.

I also contemplate the employment of means whereby a bleeding to the atmosphere, or other differential or controllable pressure may be utilized in addition to, or in place of the vacuum, as described.

What is claimed is:

1. An apparatus for treating material, embodying a casing, a feed screw for feeding the material therethrough, means in the path of the material on the feed screw causing the material to flow over it in sheeted form, and means for exhausting fluids from the sheeted material.

2. An apparatus for treating material, embodying a casing, means for feeding the material therethrough, a collar for causing the material to flow over it as a film, and means for exhausting fluids from said film.

3. An apparatus for treating material, embodying a casing, a feed screw therein, means carried by the feed screw for causing the material to flow over it as a film, and means for exhausting fluids from said film.

4. An apparatus for treating material, embodying a casing, a feed screw therein having a portion diminishing in pitch for crowding the material as it progresses on the screw, means for causing the crowded material to flow over it as a film, and means for exhausting fluid from the film.

5. An apparatus for treating material, embodying a casing, a feed screw for feeding the material therethrough, means for causing the material on the feed screw to flow over it as a film, means for exhausting fluids from the film, and means for delivering the material from the machine while maintaining the same in its exhausted condition.

6. An apparatus for treating material, embodying a casing, a feed screw for feeding the advancing material therein having spaced portions of diminished pitch for crowding the material with consequent formation of seals, means for causing the material to flow over it as a film between said seals, and means for exhausting fluids from said film.

7. An apparatus for treating material, embodying a casing, a feed screw having spaced portions of diminished pitch for crowding the material with consequent formation of seals, a collar carried by the feed screw for causing the material to flow over it as a film between said seals, and means for exhausting fluids from the film.

8. An apparatus for treating material, embodying a casing, means for controlling the temperature of the casing, a feed screw in the casing, means for controlling the temperature of the feed screw, means in the path of the material for causing the material to flow over it as a film, and means for exhausting fluids from the film.

9. An apparatus for treating material, embodying a casing having an intake opening and a delivery opening, means for feeding the material from the intake opening to the delivery opening, means in the path of the material for causing the material to flow over it as a film, means for exhausting fluids from the film, and means for maintaining a differential of temperature between the material passing through the delivery opening and that passing to the delivery opening.

10. An apparatus for treating material embodying a casing, feed means for feeding the material therethrough, means for opening the material to the action of an exhaust and means for exhausting fluids from the material said feed means having a portion disposed beyond the opening means for continually feeding the material as exhausted to a point out of contact with other material to be treated.

11. An apparatus for treating material embodying a casing, feed means for feeding the material therethrough, means to form a sheet of the material and means for exhausting fluids from the sheeted material, said feed means having a portion disposed beyond the opening means for continually feeding the material as exhausted to a position out of contact with material to be exhausted.

12. An apparatus for treating material embodying a casing, a feed screw for feeding the material therethrough, means for exhausting the material and means for opening the material to the action of the exhaust.

13. An apparatus for treating material embodying a casing, feed means for passing material therethrough, means in the path of the material causing the material to flow over the feed means in tubular sheeted form and means for exhausting fluids from the sheeted material.

14. An apparatus for treating material comprising means to form a film of material, means to provide a seal at certain points of the film and means to evacuate the film.

15. An apparatus for treating material comprising means to form a plurality of banks of the material constituting seals, means to form a film between said banks and means to exhaust said film.

16. An apparatus for treating material comprising a casing having an open inlet and outlet for material, means to feed material through said casing, means to form a sheet of said material in passing through said casing, means to provide a seal at certain points of the sheet and means to evacuate the sheet between the seals so formed.

Signed at New York, county and State of New York, this 21st day of April 1915.

WILLIAM J. STEINLE.